(12) United States Patent
Kushnarenko

(10) Patent No.: US 6,466,079 B1
(45) Date of Patent: Oct. 15, 2002

(54) HIGH VOLTAGE CHARGE PUMP FOR PROVIDING OUTPUT VOLTAGE CLOSE TO MAXIMUM HIGH VOLTAGE OF A CMOS DEVICE

(75) Inventor: Alexander Kushnarenko, Haifa (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 0 days.

(21) Appl. No.: 09/888,353

(22) Filed: Jun. 21, 2001

(51) Int. Cl.[7] .............................. H02M 3/18; G05F 3/16
(52) U.S. Cl. ........................ 327/536; 327/537; 363/60
(58) Field of Search ................................ 327/536, 537; 307/110; 363/59, 60

(56) References Cited

U.S. PATENT DOCUMENTS

| | | | | |
|---|---|---|---|---|
| 4,593,320 A | * | 6/1986 | Nishizawa et al. | 348/307 |
| 5,352,936 A | * | 10/1994 | Allen | 327/530 |
| 5,506,528 A | * | 4/1996 | Cao et al. | 327/108 |
| 6,184,594 B1 | * | 2/2001 | Kushnarenko | 307/60 |

* cited by examiner

Primary Examiner—Timothy P. Callahan
Assistant Examiner—Terry L. Englund
(74) Attorney, Agent, or Firm—E. Eric Hoffman; Bever, Hoffman & Harms, LLP

(57) ABSTRACT

An output stage for a charge pump is provided that includes a first PMOS transistor, a second PMOS transistor, a pull-down transistor and a capacitor. The first PMOS transistor includes a source and a bulk region coupled to receive a charging signal, a drain coupled to a first node, and a gate coupled to receive a switching signal. The second PMOS transistor has a drain coupled to the first node, a gate coupled to receive the switching signal, and a source and a bulk region coupled to an output terminal. The capacitor is coupled between the output terminal and the ground voltage supply terminal, and charges when the first and second PMOS transistors are turned on. The pull-down transistor is configured to discharge the first node at the end of each charging cycle, thereby preventing drain-to-bulk junctions of the PMOS transistors from being forward biased during normal operation.

20 Claims, 3 Drawing Sheets

HIGH VOLTAGE CHARGE PUMP FOR PROVIDING OUTPUT VOLTAGE CLOSE TO MAXIMUM HIGH VOLTAGE OF A CMOS DEVICE

FIELD OF THE INVENTION

The present invention relates to a charge pump circuit for generating a voltage on an integrated circuit device. More specifically, the present invention relates to an output stage for a charge pump circuit that provides a DC voltage output that approaches the maximum high (breakdown) voltage of a CMOS device.

BACKGROUND OF THE INVENTION

FIG. 1 is a block diagram of a conventional voltage generator 100 used to generate a DC voltage, greater than the $V_{CC}$ supply voltage, on an integrated circuit chip. Voltage generator 100 includes synchronizer 101, charge pump 102 and output stage 103. Synchronizer 101 provides a clock signal CLK having a frequency of $F_{CLK}$ to charge pump 102. In response, charge pump 102 generates a charge pump output voltage $V_{CH}$ having an amplitude of $V_{CH\_MAX}$ and a frequency of $F_{CLK}$. Also in response to the CLK signal, charge pump 102 provides a switching signal $V_{SW}$ having a frequency of $F_{CLK}$. The $V_{CH}$ and $V_{SW}$ signals are provided to output stage 103.

Output stage 103 includes NMOS transistor 111, capacitor 112 and output terminal 113. The source of NMOS transistor 111 is coupled to receive the $V_{CH}$ signal, the gate of NMOS transistor 111 is coupled to receive the $V_{SW}$ signal, and the drain of NMOS transistor is coupled to output terminal 113. The bulk of NMOS transistor 111 is coupled to ground. Capacitor 112 is coupled between the drain of NMOS transistor 112 and ground. The output voltage $V_{OUT}$ is provided on output terminal 113.

Voltage generator 100 operates as follows. Shortly after the $V_{CH}$ signal transitions to a high state, the $V_{SW}$ signal transitions to a high state, thereby turning on NMOS transistor 111 and charging capacitor 112. The $V_{SW}$ signal subsequently transitions to a low state, thereby turning off NMOS transistor 111. Shortly thereafter, the $V_{CH}$ signal transitions to a low state. At this time, capacitor 112 discharges. Capacitor 112 ensures that a relatively constant DC output voltage $V_{OUT}$ is provided on output terminal 113.

The maximum output voltage $V_{OUT}$ is undesirably limited by the characteristics of NMOS transistor 111. NMOS transistor 111 has a maximum high voltage $V_{MAX}$ (i.e., breakdown voltage) that cannot be exceeded, or the transistor will be damaged. The maximum output voltage $V_{OUT}$ is equal to the breakdown voltage $V_{MAX}$ minus the threshold voltage of transistor 111 ($V_{TH}$) and the body effect. Thus, if the maximum voltage $V_{MAX}$ of NMOS transistor 111 is 12 Volts, and the threshold voltage $V_{TH}$ and body effect of NMOS transistor 111 is 2 Volts, then the output voltage $V_{OUT}$ is limited to only 10 Volts.

Note that NMOS transistor 111 cannot simply be replaced by a PMOS transistor because the source-to-bulk junction and the drain-to-bulk junction of the PMOS transistor would become forward biased. thereby preventing proper charging and discharging of capacitor 112.

It would therefore be desirable to have a voltage generating circuit that is capable of overcoming the deficiencies of the above-described circuit.

SUMMARY

Accordingly, the present invention provides a voltage generation circuit having an improved output stage, which allows the maximum output voltage to closely approximate the breakdown voltage of a CMOS transistor.

An output stage of the present invention includes a first PMOS transistor having a source region and a bulk region coupled to receive the charging voltage signal $V_{CH}$ from a corresponding charge pump. The charging voltage $V_{CH}$ periodically transitions between a low charging voltage $V_{CH\_MIN}$ and a high charging voltage $V_{CH\_MAX}$. The first PMOS transistor further includes a drain region coupled to a first node, and a gate coupled to receive a switching voltage signal $V_{SW}$.

A second PMOS transistor is connected in series with the first PMOS transistor. More specifically, the second PMOS transistor includes a drain region coupled to the first node, a gate coupled to receive the switching voltage signal $V_{SW}$, and a source region and a bulk region coupled to an output terminal.

A capacitor is coupled between the output terminal and the ground voltage supply terminal. This capacitor charges and discharges to provide an output voltage $V_{OUT}$. A pull-up transistor can be provided to help pull the output terminal up toward a voltage equal to a $V_{CC}$ supply voltage minus the threshold voltage of the pull-up transistor.

A discharging transistor is coupled between the first node and a ground voltage supply terminal. The gate of the discharging transistor is coupled to receive a discharge enable signal (DIS) from the charge pump. In one embodiment, the discharging transistor is an NMOS transistor.

During a first period of a charging cycle, the charging voltage $V_{CH}$ is asserted at the high value of $V_{CH\_MAX}$, and the switching voltage $V_{SW}$ is asserted low, such that the first and second PMOS transistors are turned on, and the capacitor charges. The first PMOS transistor is sized to have a relatively high on-resistance compared to the second PMOS transistor. As a result, the charging current is minimized, thereby minimizing the drain-to-source voltage drop across the second PMOS transistor to a voltage less than a junction voltage drop. Consequently, the drain-to-bulk junction of the second PMOS transistor is not forward biased during the first period of the charging cycle. The first and second PMOS transistors enable the voltage applied to the capacitor to be approximately equal to $V_{CH\_MAX}$. As a result, the output voltage $V_{OUT}$ can advantageously approach the breakdown voltage of the PMOS transistors.

During a second period of the charging cycle, the discharge enable signal DIS is asserted high, thereby turning on the discharging transistor coupled to the first node, and causing the first node to discharge. Because the drains of the first and second PMOS transistors are coupled to the first node, the drain-to-bulk junctions of the first and second PMOS transistors are prevented from being forward biased during the second period of the charging cycle.

The present invention will be more fully understood in view of the following description and drawings.

DETAILED DESCRIPTION

Figure 1:
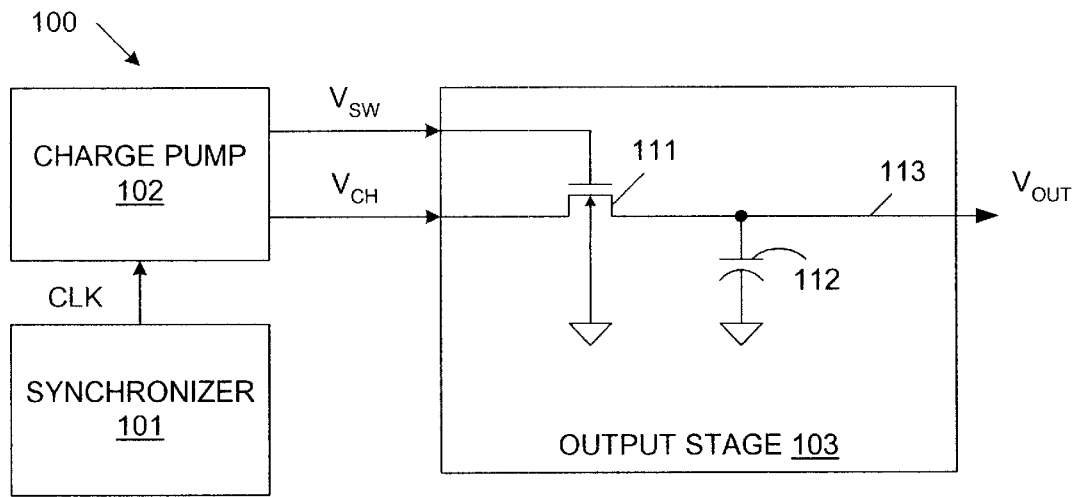
FIG. 1 is a block diagram of a conventional voltage generation circuit.
Figure 2:
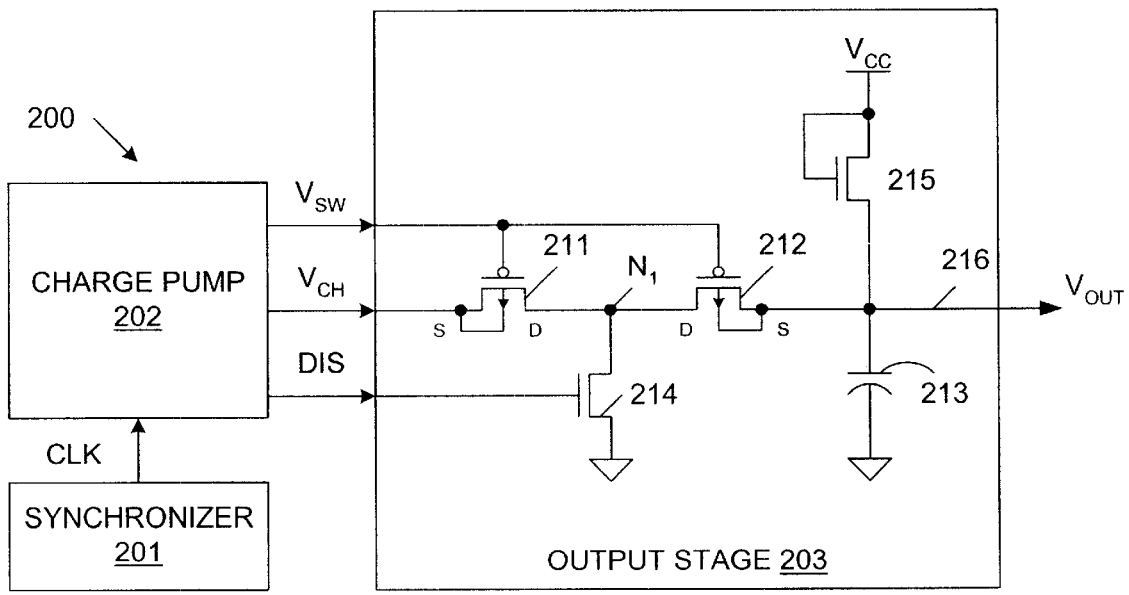
FIG. 2 is a block diagram of a voltage generation circuit in accordance with one embodiment of the present invention.

FIG. 2 is a block diagram of voltage generator 200 that generates a DC voltage, greater than the $V_{CC}$ supply voltage, on an integrated circuit chip in accordance with one embodiment of the present invention. Voltage generator 200 includes synchronizer 201, charge pump 202 and output stage 203. Synchronizer 201 provides a clock signal CLK having a frequency of $F_{CLK}$ to charge pump 202. In response, charge pump 202 generates a charge pump output voltage $V_{CH}$ that oscillates at a frequency of $F_{CLK}$ between a maximum voltage of $V_{CH\_MAX}$ and a minimum voltage of $V_{CH\_MIN}$. Also in response to the CLK signal, charge pump 202 provides a switching signal $V_{SW}$ that oscillates at a frequency of $F_{CLK}$ between a maximum voltage of $V_{SW\_HI}$ and a minimum voltage of $V_{SW\_LO}$. In the described embodiment, the $V_{CH}$ and $V_{SW}$ signals are not symmetrical (i.e., these signals do not have equal high and low periods), although this is not necessary. Charge pump 202 also generates a discharge signal (DIS) in response to the CLK signal. The $V_{CH}$, $V_{SW}$ and DIS signals are provided to output stage 203. Charge pump 202 is described in more detail below.

Output stage 203 includes PMOS transistors 211–212, capacitor 213, NMOS transistors 214–215 and output terminal 216. In the described embodiment, capacitor 213 is a CMOS device having a gate coupled to output terminal 216 and source/drain regions coupled to ground. The source and bulk of PMOS transistor 211 are coupled to receive the $V_{CH}$ signal, the gate of PMOS transistor 211 is coupled to receive the $V_{SW}$ signal, and the drain of PMOS transistor 211 is coupled to node $N_1$. The drain of PMOS transistor 212 is coupled to node $N_1$, the gate of PMOS transistor 212 is coupled to receive the $V_{SW}$ signal, and the source and bulk of PMOS transistor 212 are coupled to output terminal 216.

NMOS transistor 214 is coupled between node N1 and the ground supply terminal. The gate of NMOS transistor 214 is coupled to receive the DIS signal from charge pump 202. NMOS transistor 215 is coupled between the $V_{CC}$ supply terminal and output terminal 216. The gate of NMOS transistor 215 is coupled to the $V_{CC}$ supply terminal. In other embodiments, transistors 214 and 215 can be PMOS transistors. Capacitor 213 is coupled between output terminal 216 and the ground supply terminal.

In general, output stage 203 allows capacitor 213 to charge to a voltage approximately equal to $V_{CH\_MAX}$ through PMOS transistors 211–212. Advantageously, the amplitude of signal $V_{SW}$ does not have to be higher than the amplitude of signal $V_{CH}$.

Moreover, PMOS transistors 211–212 do not face a forward bias problem.

Figure 3:
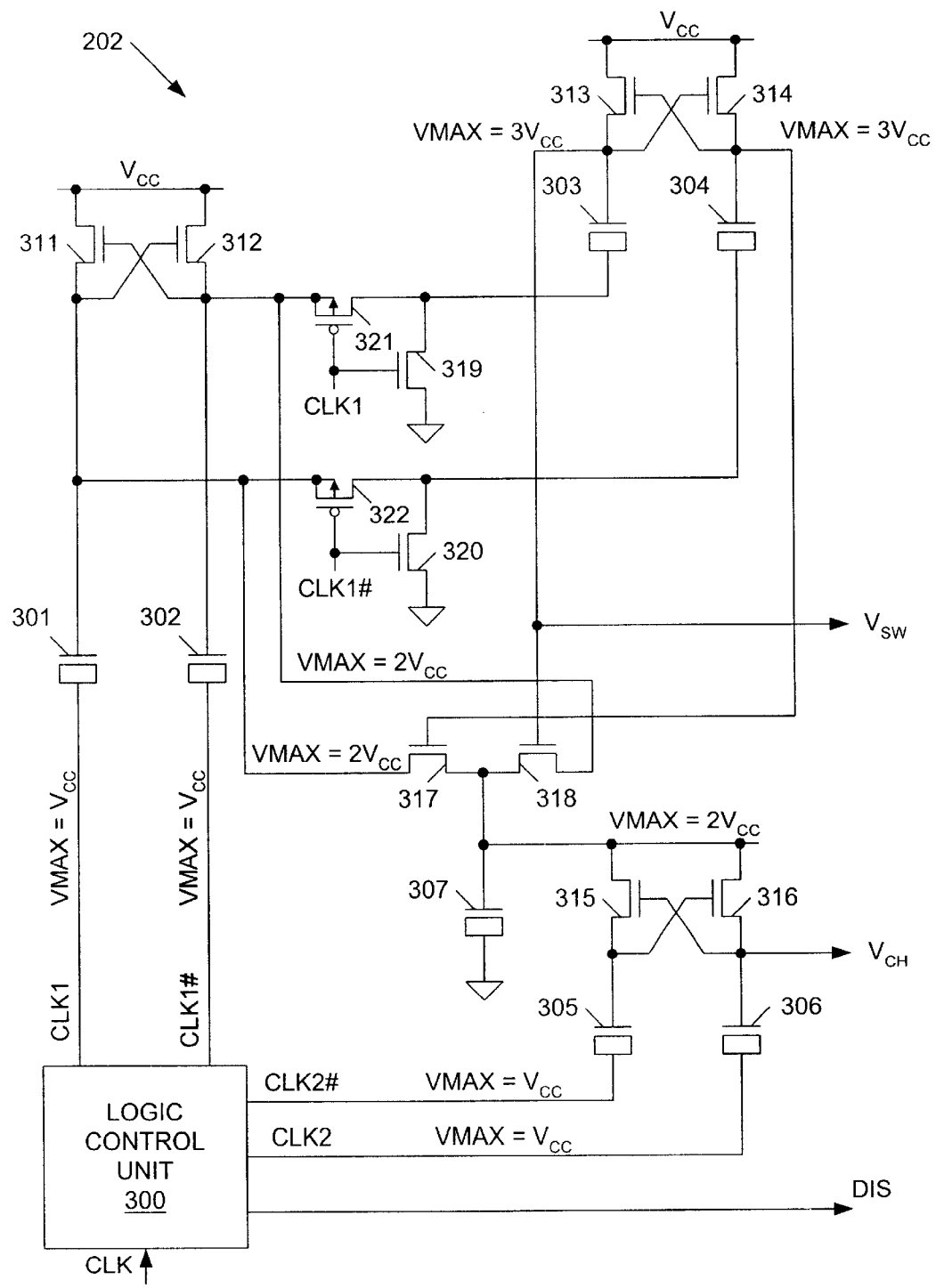
FIG. 3 is a block diagram of a charge pump used in the voltage generation circuit of FIG. 2 in accordance with one embodiment of the present invention.

FIG. 3 is a circuit diagram of charge pump 202 in accordance with one embodiment of the present invention. Although a specific charge pump 202 is illustrated in FIG. 3, it is understood that other charge pumps can be used in accordance with the present invention. For example, charge pump 202 can be implemented using a charge pump in accordance with the teachings of U.S. Pat. No. 6,184,594, issued to Kushnarenko.

Charge pump 202 includes logic control unit 300, capacitors 301–307, NMOS transistors 311–320, and PMOS transistors 321–322, which are connected as illustrated. Logic control unit 300 receives the CLK signal, and in response, generates complementary clock signals CLK1 and CLK1#, complementary clock signals CLK2 and CLK2#, and the DIS signal.

Charge pump 202 operates as follows. During a first phase of the CLK1 cycle, the CLK1 signal has a high value of $V_{CC}$, and the CLK1# signal has a low value of 0 Volts. At this time, capacitor 302 charges to a voltage of $V_{CC}$ through turned-on transistor 312, and capacitor 303 charges to a voltage of $V_{CC}$ through turned-on transistors 313 and 319. As a result, the $V_{SW}$ signal has a low voltage ($V_{SW\_LO}$) of $V_{CC}$ when the CLK1 signal has a high value. Also at this time, previously charged capacitor 301 discharges a voltage of $2V_{CC}$ through turned-on PMOS transistor 322, and previously charged capacitor 304 discharges a voltage of $3V_{CC}$ to the gate of NMOS transistor 317. As a result, transistor 317 turns on, thereby charging capacitor 307 to a voltage of $2V_{CC}$.

During a second phase of the CLK1 cycle, the CLK1 signal has a low value of 0 Volts, and the CLK1# signal has a high value of $V_{CC}$ Volts. At this time, capacitor 301 charges to a voltage of $V_{CC}$ through turned-on transistor 311, and capacitor 304 charges to a voltage of $V_{CC}$ through turned-on transistors 314 and 320. Also at this time, previously charged capacitor 302 discharges a voltage of $2V_{CC}$ through turned-on PMOS transistor 321, and previously charged capacitor 303 discharges a voltage of $3V_{CC}$ to the gate of NMOS transistor 318. Under these conditions, transistor 318 turns on, thereby charging capacitor 307 to a voltage of $2V_{CC}$. Thus, capacitor 307 is charged to a voltage of $2V_{CC}$ during both phases of the CLK1 signal. Note that the $V_{SW}$ signal has a high voltage ($V_{SW\_HI}$) of $3V_{CC}$ when the CLK1 signal has a low value.

The generation of the charging voltage $V_{CH}$ will now be described. During a first phase of the CLK2 cycle, the CLK2 signal has a high value of $V_{CC}$ and the CLK2# signal has a logic low value of 0 Volts. At this time, capacitor 305 charges to a voltage of $2V_{CC}$ through turned-on transistor 315, and previously charged capacitor 306 discharges a high voltage ($V_{CH\_MAX}$) of $3V_{CC}$.

During a second phase of the CLK2 cycle, the CLK2 signal has a low value of 0 Volts and the CLK2# signal has a high value of $V_{CC}$. At this time, previously charged capacitor 305 discharges a voltage of $3V_{CC}$ to the gate of transistor 316. As a result, transistor 316 turns on, thereby charging capacitor 306 to a voltage ($V_{CH\_MIN}$) of $2V_{CC}$.

Turning now to the DIS signal, logic control unit 300 initially asserts the DIS signal high until charge pump 202 has developed full voltages for output signals $V_{SW}$ and $V_{CH}$. Logic control unit 300 initially drives the DIS signal low just prior to a rising edge of the CLK2 signal. Thereafter, logic control unit 300 drives the DIS signal high in response to the falling edge of the CLK1 signal. Logic control unit 300 then drives the DIS signal low in a self-timed manner (i.e., after a predetermined delay).

Figure 4:
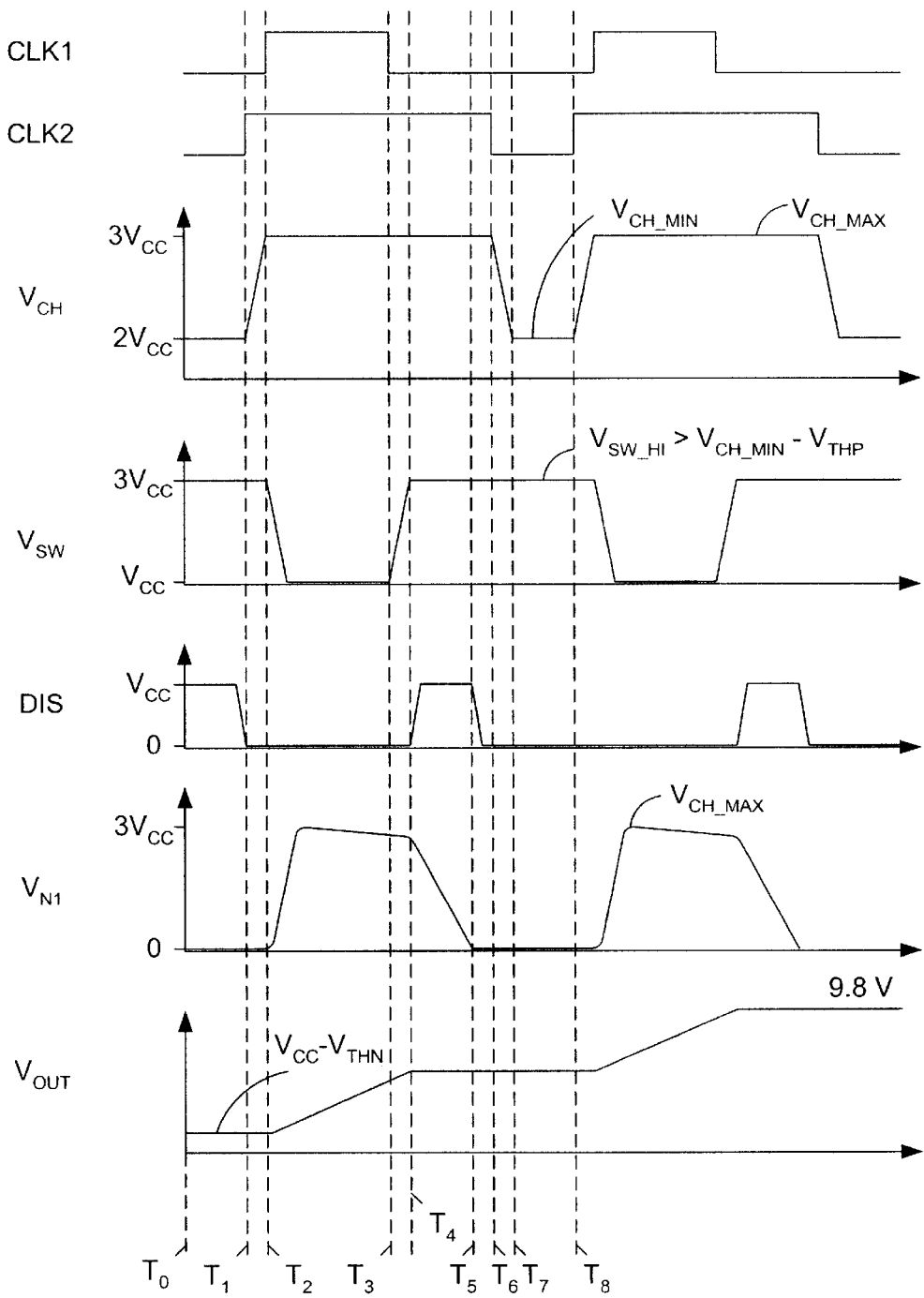
FIG. 4 is a waveform diagram illustrating the operation of the voltage generation circuit of FIG. 2 in accordance with one embodiment of the present invention.

FIG. 4 is a waveform diagram that illustrates the operation of charge pump 202 and output stage 203 in accordance with one embodiment of the present invention.

The initial state of output stage 203 at time $T_0$ is defined as follows. Both the CLK1 and CLK2 signals have a low voltage. The discharge signal DIS is asserted at a logic high voltage of $V_{CC}$. As a result, NMOS transistor 214 is turned on, thereby discharging node $N_1$ to ground. The voltage on node $N_1$ is designated as voltage $V_{N1}$ in FIG. 4. The charge pump voltage $V_{CH}$ has a relatively small positive potential, $V_{CH\_MIN}$ at this time.

As described above, $V_{CH\_MIN}$ has a voltage of about 2 times the $V_{CC}$ supply voltage, or about 6.6 Volts, in the present example. The switch signal $V_{SW}$ is de-asserted at a logic high voltage $V_{SW\_HI}$, thereby turning off PMOS transistors 211 and 212. In the described embodiment, the $V_{SW\_HI}$ voltage is not lower than $V_{CH\_MIN}$ minus the threshold voltage of PMOS transistors 211–212 ($V_{THP}$), or about 6.0 Volts. As described above, $V_{SW\_HI}$ has a voltage of about 3 times the $V_{CC}$ supply voltage, or about 9.9 Volts, in the present example. Output terminal 216 is pulled up to a positive potential ($V_{OUT}$) equal to the $V_{CC}$ supply voltage minus the threshold voltage of NMOS transistor 215 ($V_{THN}$), or about 2.7 Volts.

Under these conditions, the bulk and source regions of PMOS transistor 211 are held at the positive potential $V_{CH\_MIN}$, the bulk and source regions of PMOS transistor 212 are held at the positive potential of $V_{CC}-V_{THN}$, and the drain regions of PMOS transistors 211–212 are held at 0 Volts. As a result, the p-n junctions of PMOS transistors 211 and 212 are not forward biased at this time. As a result, capacitor 213 does not discharge through PMOS transistors 211 and 212 at this time.

Just prior to time $T_1$, logic control unit 300 de-asserts the discharge signal DIS low (0 Volts), thereby turning off NMOS transistor 214. At time $T_1$, logic control unit 300 asserts the CLK2 signal high. As a result, the charge pump voltage $V_{CH}$ begins to increase. At time $T_2$, the charge pump voltage $V_{CH}$ reaches the maximum voltage Of $V_{CH\_MAX}$, which is about $3V_{CC}$ or 9.9 Volts in the described example. Also at time $T_2$, logic control unit 300 asserts the CLK1 signal high. As a result, the switch signal $V_{SW}$ is asserted to a logic low voltage ($V_{SW\_LO}=V_{CC}$), thereby turning on PMOS transistors 211 and 212. Current flows to capacitor 213 through turned-on PMOS transistors 211 and 212. Because node N1 was previously discharged to ground, this current begins to charge node N1. The voltage $V_{N1}$ of node N1 increases with a ramp function to a voltage equal to $V_{CH\_MAX}$. This ramp function is defined by the parasitic capacitance of the junction of node N1 and the current through PMOS transistor 211 (~20 micro-amps).

The high voltage $V_{N1}$ on node N1 causes current to flow through turned-on PMOS transistor 212 and capacitor 213. As a result, capacitor 213 begins to charge and the output voltage $V_{OUT}$ on terminal 216 increases. Because turned-on PMOS transistor 212 has an on-resistance, the output voltage $V_{OUT}$ increases at a slower rate than the voltage $V_{N1}$ on node $N_1$. As a result, the bulk of PMOS transistor 212 has a lower potential than the drain of PMOS transistor 212. To forward bias the drain-to-bulk junction of PMOS transistor 212, the voltage difference between the drain and bulk must be −0.5 Volts or less. As described below, the drain-to-bulk voltage is limited to a voltage which prevents the drain-to-bulk junction from being forward biased.

The drain-to-bulk voltage of PMOS transistor 212 is dependent upon the current flowing through PMOS transistor 212. The current though PMOS transistor 212 is defined by the following equation.

$$I_s = V_{ds}/R_{open}$$

In this equation, $V_{ds}$ is equal to the source-drain voltage drop of PMOS transistor 212, $I_s$ is equal to the current through turned on PMOS transistor 212, and $R_{open}$ is equal to the resistance of turned on PMOS transistor 212.

The resistance $R_{open}$ of PMOS transistor 212 is controlled by selecting an appropriate width-to-length ratio for PMOS transistor 212. In the described example, PMOS transistor 212 has a width-to-length ratio of about 2 and an on-resistance $R_{open}$ of about 6 Kohms.

In order to make $V_{ds}$ as low as possible (e.g., 50 mV) the current $I_s$ must be limited. The width-to-length ratio of PMOS transistor 211 is therefore selected to provide a high on-resistance to PMOS transistor 211, such that the resistance of PMOS transistor 211 is high enough to limit the current $I_s$ to a desirable level. In the described example, PMOS transistor 211 has a width-to-length ratio of about 0.5 and an on-resistance of about 40 Kohms. Selecting the resistance of PMOS transistor 211 in this manner limits the current $I_s$ to about 10 micro-amps. As a result, the drain-to-bulk voltage of PMOS transistor 212 is limited to a magnitude of about −0.050 Volts. As a result, the drain-to-bulk junction in PMOS transistor 212 is not forward biased.

Capacitor 213 charges to a voltage greater than $V_{CC}-V_{THN}$ during the period between time T2 and time T3. At time T3, logic control unit 300 de-asserts the CLK1 signal low. In response, charge pump 202 de-asserts the $V_{SW}$ signal to a logic high voltage ($V_{SW\_HI}$) of about $3V_{CC}$, thereby turning off PMOS transistors 211 and 212.

At time T4, logic control unit 300 asserts the discharge signal DIS high, thereby turning on NMOS transistor 214. Turned on NMOS transistor 214 begins to pull the voltage $V_{N1}$ on node $N_1$ down toward ground. At time T5, the voltage $V_{N1}$ on node $N_1$ has been discharged all the way to ground. At this time, logic control unit 300 de-asserts the discharge signal DIS low in a self-timed manner, thereby turning off NMOS transistor 214.

Between time T4 and time T5, the drain voltages of PMOS transistors 211 and 212 ($V_{N1}$) become lower, while the voltages on the sources of these transistors 211 and 212 ($V_{CH}$, $V_{OUT}$) remain at their previous high voltages. As a result, the bulk-to-drain junctions of PMOS transistors 211 and 212 are not forward biased during this time period.

At time T6, logic control unit 300 de-asserts the CLK2 signal to a logic low value. In response, the charge pump voltage $V_{CH}$ is reduced to a voltage of $V_{CH\_MIN}$ (time T7), as charge pump 202 begins to re-charge capacitor 306 (FIG. 3). The first charging cycle is completed at time T8. A second charging cycle, which is identical to the first charging cycle, begins at time T8. Note that capacitor 213 retains its charge from time T7 to time T8.

This sequence is repeated until capacitor 213 is charged to a potential approximately equal to $V_{CH\_MAX}$, such that capacitor 213 provides an output voltage $V_{OUT}$ approximately equal to $V_{CH\_MAX}$. Advantageously, the structure of output stage 203 allows PMOS transistors to be used to charge capacitor 213, such that capacitor 213 can be charged to a voltage that is close to the breakdown voltage of PMOS transistors 211 and 212. For example, if the breakdown voltage of PMOS transistors 211 and 212 is equal to 12 Volts, the output voltage $V_{OUT}$ can have a DC voltage of about 11.9 Volts. Note that the described example does not provide an output voltage $V_{OUT}$ having the highest possible voltage.

Although invention has been described in connection with several embodiments, it is understood that this invention is not limited to the embodiments disclosed, but is capable of various modifications, which would be apparent to a person skilled in the art. For example, although the present invention has been described using a specific set of voltages, it is understood that other voltages can be used in other embodiments. Thus, the invention is limited only by the following claims.

What is claimed is:

1. An output stage for a charge pump comprising:
a first PMOS transistor having a source region and a bulk region coupled to receive a charging voltage signal $V_{CH}$, a drain region coupled to a first node, and a gate coupled to receive a switching voltage signal $V_{SW}$;

a second PMOS transistor having a drain region coupled to the first node, a gate coupled to receive the switching voltage signal $V_{SW}$, and a source region and a bulk region coupled to an output terminal;

a pull-down transistor coupled between the first node and a ground voltage supply terminal, the pull-down transistor having a gate coupled to receive a discharge enable signal; and a capacitor coupled between the output terminal and the ground voltage supply terminal.

2. The output stage of claim 1, wherein the pull-down transistor is an NMOS transistor.

3. The output stage of claim 1, further comprising an NMOS transistor coupled between a $V_{CC}$ voltage supply terminal and the output terminal, wherein the gate of the NMOS transistor is coupled to the $V_{CC}$ voltage supply terminal.

4. The output stage of claim 1, wherein the first PMOS transistor has an on-resistance that is greater than an on-resistance of the second PMOS transistor.

5. The output stage of claim 1, wherein the first PMOS transistor has a first width-to-length ratio and the second PMOS transistor has a second width-to-length ratio, wherein the first width-to-length ratio is less than the second width-to-length ratio.

6. The output stage of claim 5, wherein the first width-to-length ratio is about 0.5 and the second width-to-length ratio is about 2.

7. An output stage for a charge pump comprising:

an input terminal for receiving a charge pump voltage;

an output terminal for providing an output voltage;

a pair of PMOS transistors connected in series between the input terminal and the output terminal;

a capacitor coupled between the output terminal and a ground voltage supply terminal; and means for selectively discharging drain terminals of the PMOS transistors such that bulk-to-drain junctions of the PMOS transistors are not forward biased.

8. The output stage of claim 7, wherein each of the PMOS transistors includes a source terminal coupled to a bulk terminal.

9. The output stage of claim 7, wherein each of the PMOS transistors includes a gate coupled to receive a switch control signal.

10. The output stage of claim 7, wherein the means for selectively discharging comprises a pull-down transistor coupled between the drain terminals of the PMOS transistors and the ground voltage supply terminal, the pull-down transistor having a gate coupled to receive a discharge enable signal.

11. A method of generating an output voltage in response to a charge pump voltage, the method comprising:

turning on a first PMOS transistor and a second PMOS transistor that are connected in series with at a first node between the first and second PMOS transistors, thereby routing the charge pump voltage through the first and second PMOS transistors to an output terminal;

charging a capacitor coupled to the output terminal while the first and second PMOS transistors are turned on; then turning off the first and second PMOS transistors; and then discharging the first node.

12. The method of claim 11, wherein the charge pump voltage transitions between a high charge pump voltage and a low charge pump voltage, wherein the charge pump voltage is at the high charge pump voltage while the first and second PMOS transistors are turned on.

13. The method of claim 12, wherein the charge pump voltage is at the high charge pump voltage while the first and second PMOS transistors are turned off and while the first node is discharged.

14. The method of claim 13, wherein the charge pump voltage transitions to the low charge pump voltage after the first node has been discharged.

15. The method of claim 12, further comprising sequentially repeating the steps of claim 11.

16. The method of claim 11, wherein the step of discharging the first node is performed by turning on an NMOS transistor coupled between the first node and a ground voltage supply terminal.

17. The method of claim 11, further comprising pulling up the output terminal through a NMOS transistor coupled to a $V_{CC}$ voltage supply terminal.

18. The method of claim 11, wherein the first and second PMOS transistors are turned on and off in response to a switching signal.

19. The method of claim 11, further comprising, applying the charge pump voltage to a source region and a bulk region of the first PMOS transistor.

20. The method of claim 19, further comprising, routing the charge pump voltage from a source region and a bulk region of the second PMOS transistor to the capacitor.

* * * * *